(12) United States Patent
Niki et al.

(10) Patent No.: US 6,422,226 B2
(45) Date of Patent: Jul. 23, 2002

(54) MONITORING APPARATUS FOR FUEL FEED SYSTEM

(75) Inventors: Manabu Niki; Takashi Isobe; Takashi Iwamoto, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/783,142

(22) Filed: Feb. 15, 2001

(30) Foreign Application Priority Data

Feb. 24, 2000 (JP) ......................... 2000-047043

(51) Int. Cl.$^7$ ............................................. F02D 41/22
(52) U.S. Cl. .................... 123/690; 123/479; 60/285; 60/274
(58) Field of Search ................... 123/479, 690; 60/285, 274

(56) References Cited

U.S. PATENT DOCUMENTS

| | | | | |
|---|---|---|---|---|
| 5,070,847 A | * | 12/1991 | Akiyama et al. | 123/690 |
| 5,579,747 A | * | 12/1996 | Sato et al. | 123/690 |
| 5,950,606 A | * | 9/1999 | Iida et al. | 123/690 |
| 6,078,861 A | * | 6/2000 | Zimmerman et al. | 123/479 |

FOREIGN PATENT DOCUMENTS

| | | |
|---|---|---|
| JP | 8-19871 | 2/1996 |
| JP | 8-121226 | 5/1996 |
| JP | 2965797 | 8/1999 |

* cited by examiner

Primary Examiner—Erick Solis
(74) Attorney, Agent, or Firm—Arent Fox Kintner Plotkin & Kahn, PLLC (57) ABSTRACT

A highly stable engine failure diagnosing system free from influence of purging is presented. A monitoring apparatus for monitoring a fuel feed system of an internal combustion engine is provided with an A/F ratio detector and an A/F ratio controller for performing feedback control of the A/F ratio. An A/F ratio feedback coefficient is calculated according to the output of the detector. A malfunction determination parameter is calculated based on the coefficient. A purging is suspended when the parameter reaches a first decision value. The monitoring is suspended when the parameter reaches a second decision value in a purge cutting state. A value of the malfunction determination parameter it would take if the purge cut was not carried out is estimated using the value when the parameter reached the first decision value. The monitoring is resumed when the estimated value of the malfunction determination parameter reaches the second decision value.

10 Claims, 7 Drawing Sheets

MONITORING APPARATUS FOR FUEL FEED SYSTEM

BACKGROUND OF THE INVENTION

The present invention relates to an apparatus for detecting malfunctioning of a fuel feed system of an internal combustion engine (hereinafter referred to as an "engine"), and more specifically to an apparatus for detecting malfunctioning of a fuel feed system based on an output of an air-fuel (A/F) ratio sensor provided in an exhaust system of the engine.

The Japanese Laid-Open Patent Application No. 8-121226 describes a scheme for detecting malfunctioning of a fuel feed system of an engine comprising an O2 sensor for detecting an A/F ratio in exhaust gas and a purge control valve placed between a fuel tank and an air intake pipe. According to the scheme, during a failure monitoring, purging is forced to stop when a malfunction determination parameter KO2AVE, a learning value of an A/F ratio feedback coefficient, decreases below a first decision value. Then, whether or not the decrease is caused by purging is determined. If it is caused by purging, subsequent failure monitoring is suspended. When the A/F ratio feedback coefficient rises beyond a second decision value after a predetermined period has elapsed, a process determines that purging cannot affect the decision to resume the failure monitoring.

According to the scheme described above, the frequency of the failure monitoring may decrease because the monitoring does not resume until the predetermined period elapses. In addition, the monitoring may be resumed even if there is influence of purging because the monitoring is resumed in accordance with the rise of the wide-variable A/F ratio feedback coefficient beyond the predetermined decision value. Therefore, there is a need for a highly stable failure diagnosing system that is free from influence of purging.

SUMMARY OF THE INVENTION

In order to solve the above-mentioned problem, according to one aspect of the invention, a monitoring apparatus is provided for monitoring a fuel feed system of an engine having an A/F ratio controller. The controller carries out feedback control of the A/F ratio based on an output of an A/F ratio detector provided in an exhaust system of the engine.

The monitoring apparatus includes means for calculating an A/F ratio feedback coefficient based on an output of the detector and means for calculating a malfunction determination parameter based on the A/F ratio feedback coefficient. The apparatus also includes a purge cut controller for cutting purge when the parameter reaches a first decision value, and a monitor controller for suspending the monitoring when the parameter reaches a second decision value in a purge cutting state. The apparatus further includes means for estimating a value of a malfunction determination parameter that would be taken if the purge cutting had not been carried out. The estimation is performed responsive to the malfunction determination parameter reaching the second decision value and uses as an initial value the value when the parameter reached the first decision value. The monitor controller causes the monitoring to be resumed responsive to the estimated value of the malfunction determination parameter reaching the second decision value.

When the malfunction determination parameter reaches the second decision value in the purge cutting state, that is, when the fuel feed system is normally functioning but the malfunction determination parameter is determined to have decreased below the first decision value due to the influence of purging, estimation of the malfunction determination parameter starts. This estimation is carried out using as a starting value the value of the malfunction determination parameter at the time the first decision value is reached. The estimated value of the malfunction determination parameter simulates the operation of keeping monitoring the malfunction determination parameter without purge cutting after the malfunction determination parameter reached the first decision value.

When the estimated value of the malfunction determination parameter reaches the second decision value, it is determined that the condition is over in which the malfunction determination parameter decreases below the first decision value due to influence of the purging, and the failure monitoring of the fuel system is resumed.

According to the present invention, whether purging causes a decrease in the malfunction determination parameter below the first decision value is determined based on the malfunction determination parameter in accordance with the real flow of time. In addition, whether failure monitoring of the fuel system is to be resumed is determined based on the estimated value of the malfunction determination parameter which is a value of the parameter if the purge cutting is not carried out. Since the actual malfunction determination parameter is a value resulting from the purge cutting, the parameter would require a considerable period to return to a value unaffected by the purge cutting after the resumption of purging. By using the estimated value of the malfunction determination parameter, the invention allows to quickly determine whether the failure monitoring of the fuel system can be resumed. Furthermore, since the resumption of the failure monitoring is decided on the malfunction determination parameter, which is more stable than the A/F ratio feedback coefficient and its learning value, the system can operate in a stable manner.

According to another aspect of the invention, the malfunctioning determination parameter is decided in accordance with an average of the A/F ratio feedback coefficient. In addition, the monitoring apparatus further includes a determining unit, which determines that the fuel system is malfunctioning if the malfunction determination parameter fails to reach the second decision value after the purge cutting.

Since the malfunction determination parameter is decided according to the average of the A/F ratio feedback coefficient, the parameter becomes more stable than the feedback coefficient and its learning value. Therefore, stability of system control based on the malfunction determination parameter is enhanced.

BRIEF DESCRIPTION OF THE DRAWINGS

FIGS. 3(*a*) and 3(*b*) are waveform diagrams illustrating the relationships between KO2, KAV and KO2AVE.

DETAILED DESCRIPTION OF THE PREFERRED EMBODIMENTS

Figure 1:
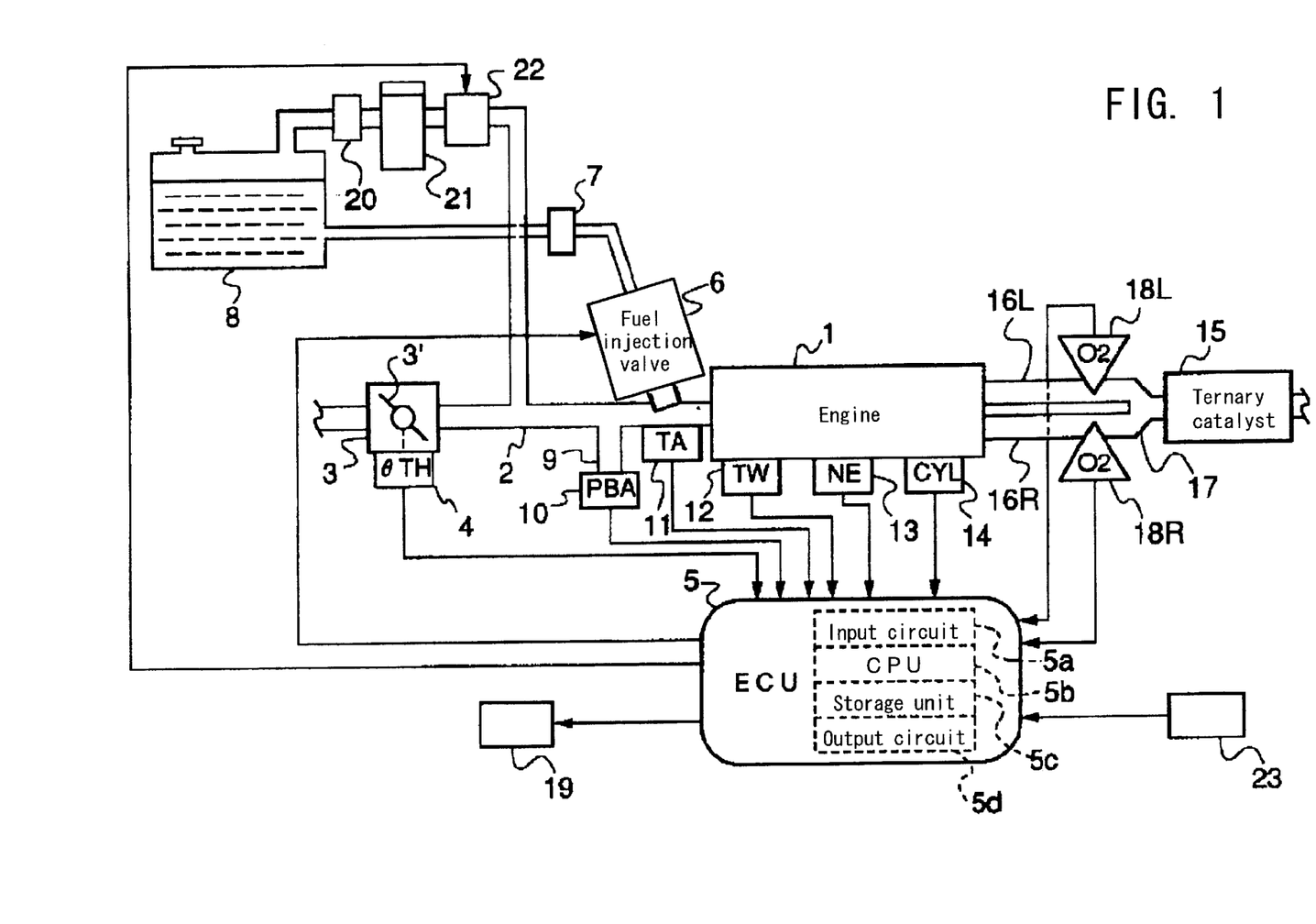
FIG. 1 is a block diagram illustrating the general configuration of an engine system to which the present invention is applied.

A preferred embodiment of the present invention will be described with reference to the accompanying drawings. FIG. 1 is a block diagram illustrating the general configuration of a fuel feed system of an engine to which the invention is applied. An engine 1 is, for example, a six-cylinder four-stroke engine provided with a throttle body 3 at a point in an air intake pipe 2, and a throttle valve 3' is placed in the throttle body 3. To the throttle valve 3' is connected a throttle valve opening angle (θTH) sensor 4, which sends an output signal corresponding to the opening angle of the throttle valve 3' to an electronic control unit (ECU) 5.

Each cylinder of the engine is provided with a fuel injection valve 6, which is connected to a fuel tank 8 via each fuel pump 7. The opening of the fuel injection valve 6 is controlled with signals sent from the ECU 5.

Downstream from the throttle valve 3' is provided an air intake pipe pressure (PBA) sensor 10 via a pipe 9, and output signal of the sensor 10 is sent to the ECU 5. Further, downstream from the air intake pipe pressure sensor 10 is an air intake temperature (TA) sensor 11, whose output signal is sent to the ECU 5.

An engine water temperature (TW) sensor 12, comprising a thermistor or the like, is fixed to the cylinder block of the engine 1 to send its output signal to the ECU 5. An engine revolution (NE) sensor 13 and a cylinder-identifying (CYL) sensor 14 are fixed to camshafts or crankshafts of the engine 1. The engine revolution sensor 13 generates a signal pulse (TDC signal pulse) at a predetermined crank angle position every 120-degree turn of the crankshaft of the engine 1, which is sent to the ECU 5. The cylinder-identifying sensor 14 generates a signal pulse at a predetermined crank angle position of a specified cylinder, which is sent to the ECU 5.

A ternary catalyst 15 is placed on an exhaust manifold 17 of exhaust pipes 16L and 16R, each provided for left and right cylinder groups of the engine 1. The catalyst 15 eliminates such ingredients as HC, CO and NOx of the exhaust gas. O2 sensors 18L and 18R, A/F ratio detectors, are provided in the exhaust pipes 16L and 16R, and generate outputs whose values change substantially in a digital manner across the boundary of the stoichiometry or theoretical A/F ratio. This output is sent to the ECU 5 and used for the feedback control of the A/F ratio.

A vehicle speed sensor 23 detects the velocity V of the vehicle on which the engine 1 is mounted, and sends its output to the ECU 5. An indicator 19, comprising a light emitting diode or the like, is turned on when the ECU 5 detects the abnormal fuel feed system.

The top of the sealed fuel tank 8 is connected to the air intake pipe 2 via a two-way valve 20, a canister 21 and a purge control valve 22. The ECU 5 controls opening and closing of the purge control valve 22. The vaporized gas generated in the fuel tank 8 pushes and opens the positive pressure valve of the two-way valve 20 when it reaches a predetermined pressure. Then the gas flows into the canister 21, where the gas is absorbed and stored in activated carbon.

When the purge control valve 22 is opened in response to a signal from the ECU 5, the vaporized gas stored in the canister 21 is sucked into the air intake pipe 2 by negative pressure alongwith the external air taken in through an air intake port provided in the canister 21.

When the fuel tank 8 is cooled by the external atmosphere or the like and the pressure in the tank decreases, the negative pressure valve of the two-way valve opens and the vaporized gas stored in the canister 21 is returned to the tank 8. Thus, the vaporized fuel generated in the fuel tank 8 is prevented from being released into the atmosphere.

The ECU 5 is provided with an input interface 5a and a central processing unit (CPU) 5b having such functions as shaping input signals sent from various sensors and to converting analog signals into digital. The CPU 5b carries out various operations to control the engine system in accordance with programs stored in a read only memory (ROM) or in a random access memory (RAM) with a back-up function which may be a part of a storage unit (memory) 5c. The memory 5c includes a regular RAM, which provides a primary storage area for various data and operation results.

An output interface 5d sends control signals based on the results of the operation by the CPU 5b to the fuel injection valve 6, the purge control valve 22, the indicator 19, spark plugs and other elements.

Figure 2:
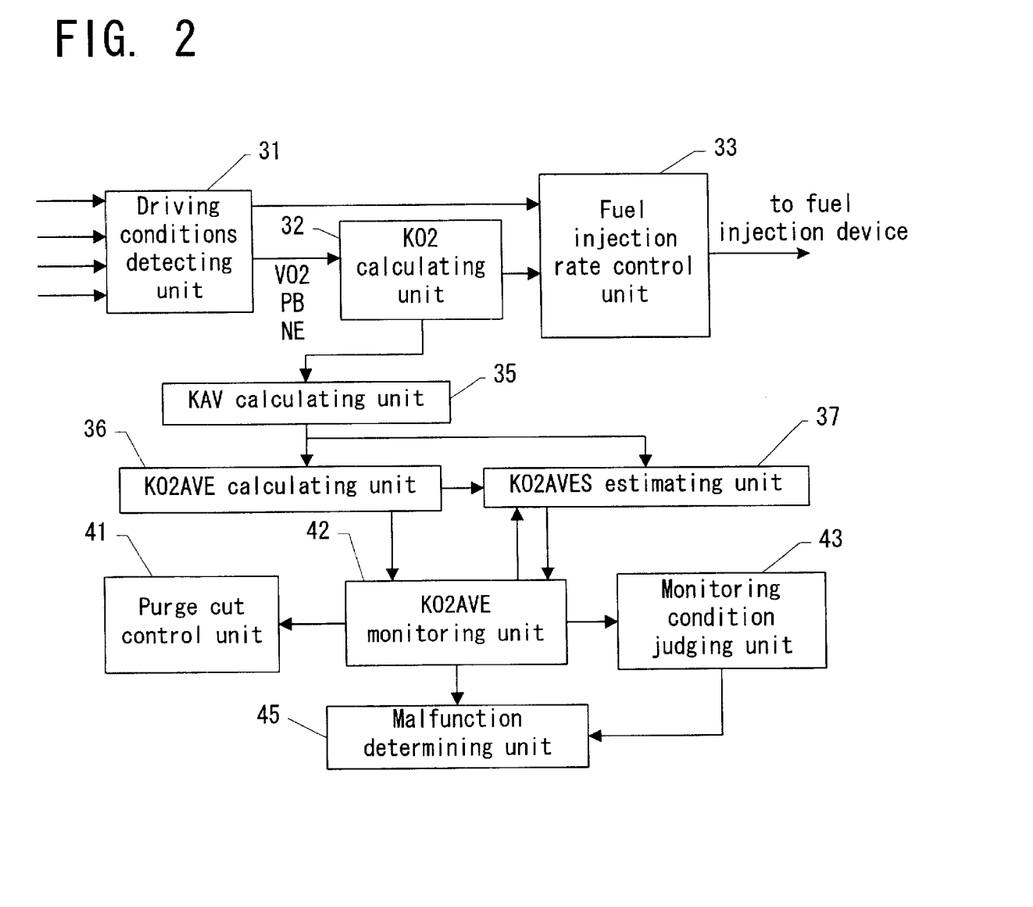
FIG. 2 is a block diagram illustrating the general configuration of a failure monitoring apparatus for a fuel feed system in a preferred embodiment of the invention.

FIG. 2 is a block diagram illustrating the general configuration of the failure monitoring apparatus on the fuel feed system according to one preferred embodiment of the invention. The functional blocks illustrated herein are realized with the CPU 5b, the memory 5c comprising RAM and ROM, and the program and data tables stored in the ROM for use with various operations.

An droving conditions detecting unit 31 receives outputs from the sensors in various parts of the engine system via the input interface 5a. The detecting unit determines whether A/F ratio feedback-controlled operation or open loop-controlled operation is to be selected according to the state of operation, and sends to a fuel injection rate control unit 33 a signal indicating the operation mode along with such information as engine revolution NE and air intake pipe pressure PB. Since the present invention concerns the engine operated in the A/F ratio feedback-controlled mode, the following description relates to operation in the A/F ratio feedback-controlled mode.

The fuel injection rate control unit 33 calculates the injection time TOUT of the fuel injection valve according to the following equation;

$$TOUT = Ti \times K1 \times KO2 + K2. \quad (1)$$

Ti is a reference value for the injection time TOUT, and is read out from a Ti map (stored in the ROM of the ECU 5) having the engine revolution NE and the air intake pipe pressure PB as parameters. K1 and K2 are respectively a correction coefficient and a correction variable calculated according to various engine parameters, and set so as to optimize the fuel consumption characteristics, the acceleration characteristics or the like according to the droving conditions of the engine.

Figure 3:
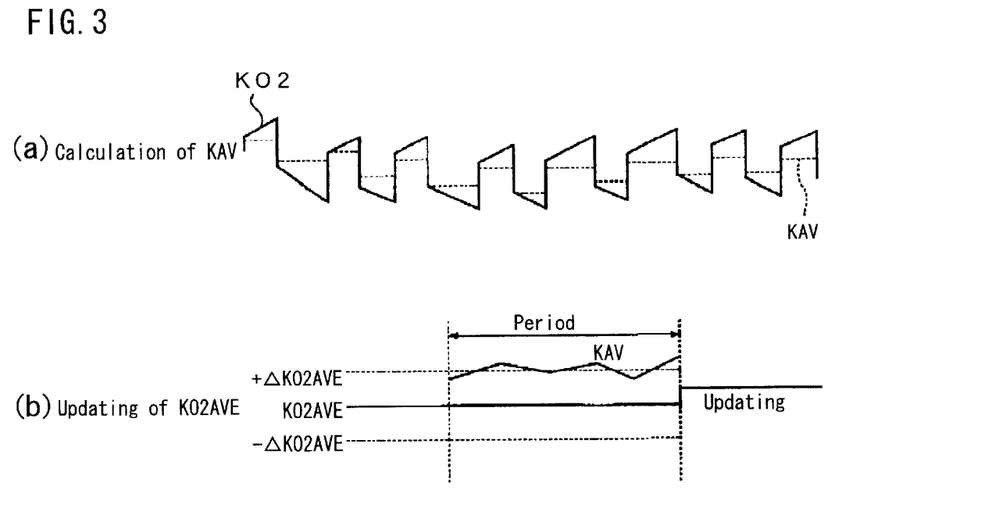

KO2 is a feedback correction coefficient for the A/F ratio, and is calculated by a KO2 calculating unit 32 based on the output from the O2 sensor. KO2 varies as illustrated in FIG. 3 (a). When the output level of the O2 sensor changes from one level to the other, for example, from rich to lean, KO2 is set so that the A/F ratio moves to the opposite direction, i.e. to become rich, by adding a proportional term (P term).

Subsequently KO2 is set to gradually become rich by adding an integral term (I term) until the O2 sensor senses rich. When the output level of the O2 sensor changes from lean to rich, KO2 is set so that the operation stated above is done the other way round (to become lean). This setting scheme is well known, and in this embodiment the proportional term and the integral term are read out from a table whose parameters are engine revolution NE and air intake pipe pressure PB.

A KAV calculating unit 35 calculates KAV, the learning value of the A/F ratio feedback coefficient KO2. KAV is calculated according to the following equation every time the proportional term is added to KO2, and varies as indicated by a dotted line in FIG. 3(a).

$$KAV = KO2 \times CO2/100 + KAV' \times (1 - CO2/100) \quad (2)$$

CO2 is a variable for setting conformity of KAV with respect to variations of the correction coefficient (A/F ratio feedback coefficient) KO2, and is set to a relatively large value within a range of 1 to 100. KAV' is a preceding value of KAV, and its initial value is set according to the value of the feedback coefficient KO2 at the time of entering a specific operation range.

Figure 4:
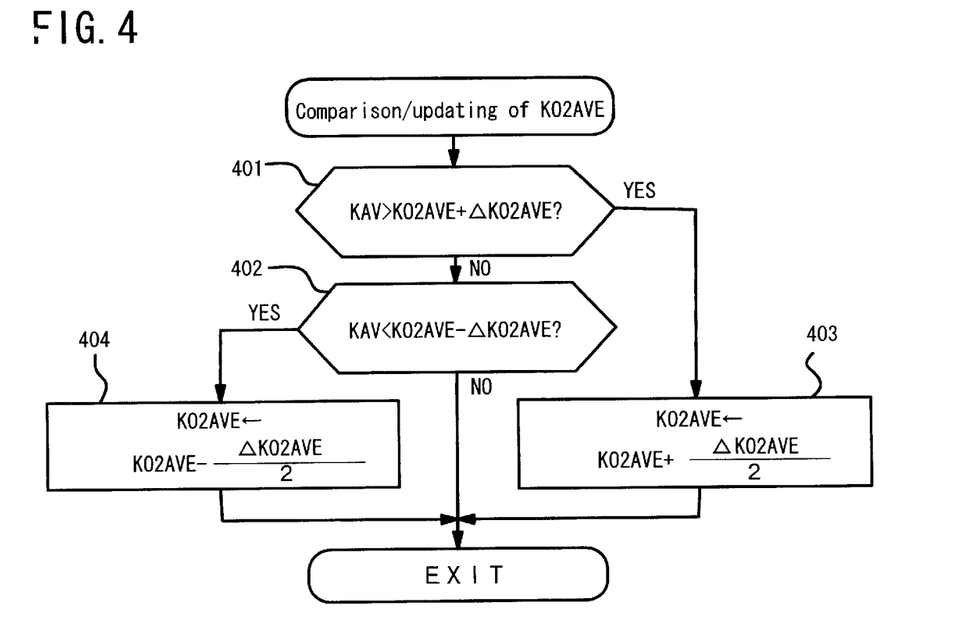
FIG. 4 is a flowchart illustrating the process of calculating the malfunction determination parameter KO2AVE.

A KO2AVE calculating unit 36 calculates a malfunction determination parameter KO2AVE following the flow shown in FIG. 4. First, whether the learning value KAV of KO2 is greater than a sum of the malfunction determination parameter KO2AVE plus a deviation for determining the secular change $\Delta KO2AVE$ (e.g. 0.0078) is determined (401). If greater, the value of KO2AVE is updated according to the following equation;

$$KO2AVE = KO2AVE + \Delta KO2AVE/2. \quad (3)$$

If the determination at step 401 is NO, the process proceeds to step 402, where whether the learning value KAV is smaller than the balance of the value of KO2AVE minus the deviation $\Delta KO2AVE$ is determined. If smaller, the value of KO2AVE is updated according to the following equation. If the determination at step 402 is NO, the process ends.

$$KO2AVE = KO2AVE - \Delta KO2AVE/2 \quad (4)$$

The process described above holds the value of the malfunction determination parameter KO2AVE as its preceding value if the learning value KAV is within the range of $KO2AVE \pm \Delta KO2AVE$, and updates the parameter KO2AVE according to above-stated Equation (3) or (4) if KAV is out of the range. FIG. 3(b) shows the relationship between the value of KAV and that of KO2AVE.

Next, function of a KO2AVE monitoring unit 42 (FIG. 2) will be described with reference to FIG. 5. The KO2AVE monitoring unit 42 monitors whether the value of KO2AVE becomes smaller than a first decision value (e.g. 0.813). When KO2AVE becomes smaller, the unit stores the value of KO2AVE at that time into a KO2AVE holding memory area (in the memory 5c). FIG. 5(d) shows the timing of holding the value of KO2AVE. At the same time, the unit 42 sends a purge cut request signal to a purge cut control unit 41 to close the purge control valve 22 to suspend purging. FIG. 5(f) shows the timing of purge cutting.

As the fuel fed to the air intake pipe decreases when purging is suspended, KO2 begins to rise. The KO2AVE monitoring unit 42 sends a signal to a monitoring condition judging unit 43 almost simultaneously with the purge cutting. The signal causes the calculation of KAV and KO2AVE to be stopped by resetting a monitor permit flag to suspend failure monitoring for a stabilizing period, which is a duration for the KO2 to become stable after increase of KO2 is stopped by purge cutting, and is, for example, about six seconds. The timing of the above operation is shown in FIGS. 5(a) and 5(g). After the stabilizing period elapses, the failure monitoring is resumed and the value of KO2AVE is updated and rises in accordance with the above-mentioned updating scheme for KAV and KO2AVE. When KO2AVE becomes greater than a second decision value (e.g. 0.828), the KO2AVE monitoring unit 42 sets a PGOK flag, which indicates that the purging causes KO2AVE to decrease below the first decision value and the fuel feed system is normal. The timing of the above operation is shown in FIG. 5(e).

Figure 5:
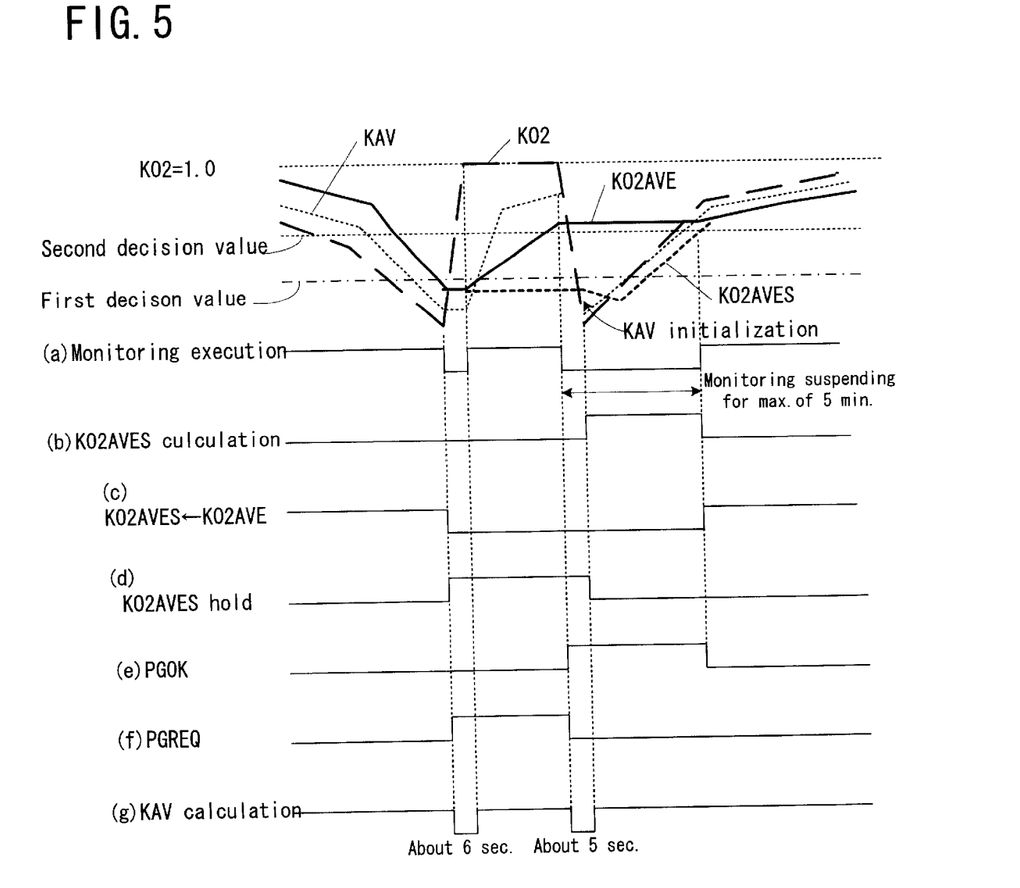
FIG. 5 is a timing chart of actions in the preferred embodiment of the invention.

If KO2AVE has not become greater than the second decision value when a predetermined period, e.g. 30 seconds, elapses after the purge cutting (FIG. 5(f)), a malfunction determining unit 45 determines that the fuel feed system failed and displays a failure indication on the indicator 19 (FIG. 1).

If the influence of purging is great, the KO2AVE monitoring unit 42 resets the purge cut request signal to the purge cut control unit 41 and sets the PGOK flag to resume purging (FIG. 5(f)). Approximately simultaneously, the monitoring condition judging unit 43 prohibits the failure monitoring on the fuel feed system in response to a signal from the KO2AVE monitoring unit 42. The timing of the above operation is shown in FIG. 5(a). Otherwise if the failure monitoring is continued, purge cutting might be requested again when the KO2AVE become smaller than the first decision value by the resumption of purging. The prohibition of failure monitoring is intended to prevent the further request.

The KO2AVE monitoring unit 42 sets a KMCND flag allowing to estimate a value of the malfunction determination parameter KO2AVES during the prohibition of failure monitoring after the lapse of a stabilizing period. The stabilizing period is from the time immediately after the failure monitoring is prohibited as described above to the time the KO2 stops decreasing as purging is resumed and is stabilized. It is, for example, about five seconds. The timing of the above operation is shown in FIG. 5(b).

Then the KO2AVE monitoring unit 42 sends a signal to a KO2AVES estimating unit 37, and start calculation of the estimated value KO2AVES using the earlier held value of KO2AVE as an initial value. The calculation of KO2AVES is carried out along the flow shown in FIG. 4, wherein an initial value of KAV is the value of KO2 when the aforementioned stabilizing period elapses after the resumption of purging.

The monitoring condition judging unit 43 resumes the failure monitoring on the fuel feed system if the value of KO2AVES estimated and updated in aforementioned manner becomes greater than the second decision value. The timing of the above operation is shown in FIG. 5(a). This means that the influence of purging is regarded as being decreased when the estimated value of the malfunction determination parameter KO2AVES becomes greater than the second decision value.

In one embodiment of the invention, when a predetermined period, e.g. five minutes, elapses after the failure monitoring on the fuel feed system is prohibited at the timing of FIG. 5(a), the monitoring condition judging unit 43 allows the failure monitoring even if the estimated value of the malfunction determination parameter KO2AVES has not become greater than the second decision value. This enables quick resumption of failure monitoring even if the influence of purging is relatively great.

Although KO2 is illustrated as a schematic linear waveform in FIG. 5, KO2 actually varies finely as shown in FIG. 3(a). The waveform of KO2 in FIG. 5 shows that it varies faster than those of KAV and KO2AVE, and varies abruptly by purge cutting. KAV follows KO2 as the learning value of KO2, and KO2AVE modestly follows KAV in accordance with the relationships represented by the above-mentioned two equations.

Figure 6:
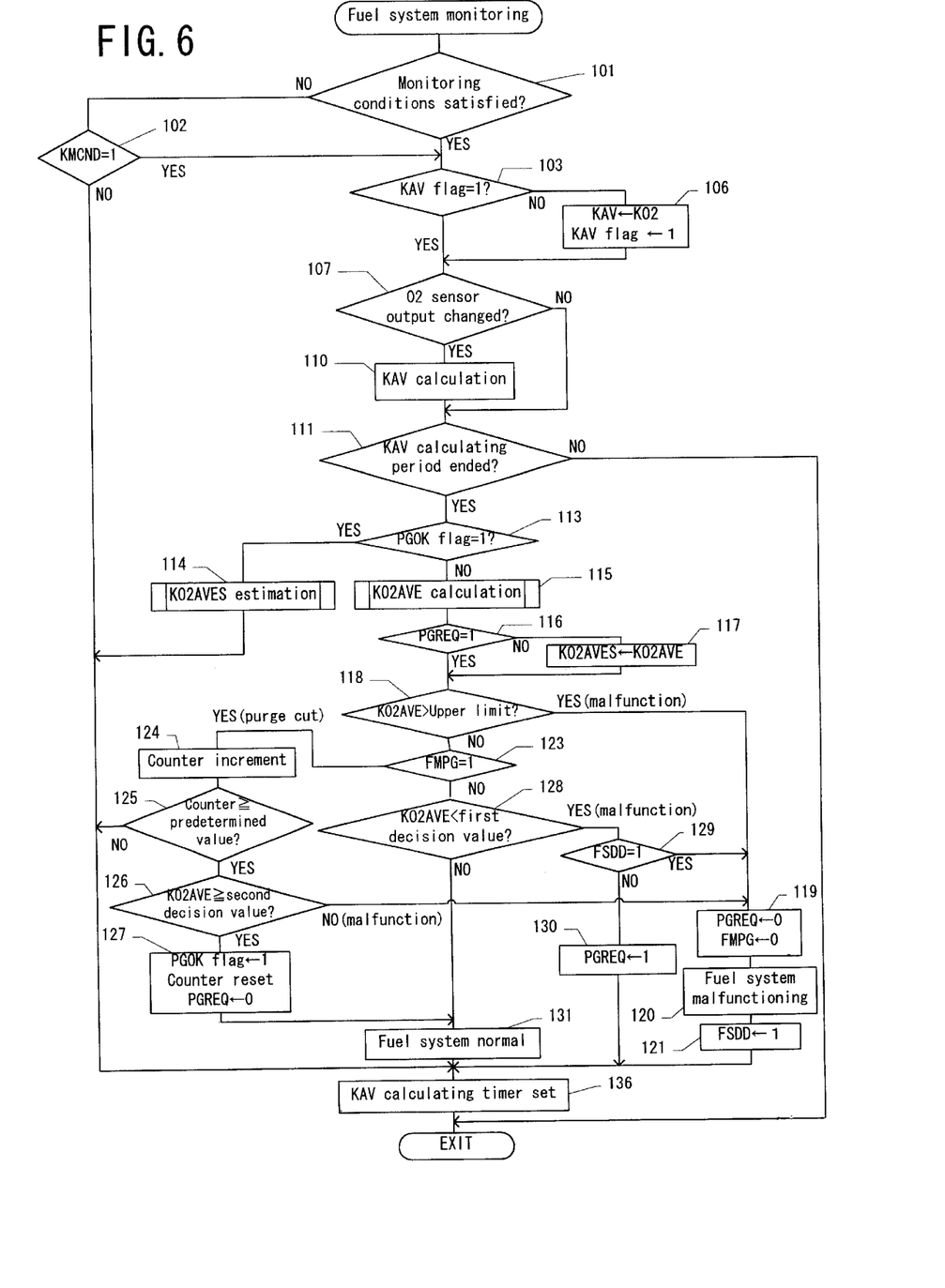
FIG. 6 is a flow chart illustrating the process of a failure monitoring on the fuel feed system of the preferred embodiment of the invention.

Next, the flow of the monitoring on the fuel feed system in one embodiment of the invention will be described with reference to FIG. 6. The process of FIG. 6 is carried out every 10 milliseconds, for example. First, whether the condition for monitoring is satisfied is determined (101). This determination of the monitoring condition is established in a flow of determining whether the monitoring condition is satisfied, which will be described below with reference to FIG. 7. If the failure monitoring is prohibited at step 101, the process proceeds to step 102 to determine whether the KMCND flag is set. As stated above, this flag indicates a permission to calculate the estimated value of the malfunction determination parameter KO2AVES during the prohibition of the failure monitoring after the resumption of purging. The flag is set at step 224 and reset at steps 203 or 225 in FIG. 7.

If at step 102 the KMCND flag is set, the process proceeds to step 103. If the KMCND flag is not set, a KAV calculation timer is set (136) and the operation exits this process.

On the other hand, if the monitoring permission flag is set at step 101, whether the learning value KAV of KO2 is initialized is determined according to a KAV flag (103). If initialized, the process directly proceeds to step 107. If not initialized, the current A/F ratio feedback coefficient (correction coefficient) KO2 is set as an initial value and the KAV flag is set to 1 at step 106, and then the process proceeds to step 107.

If the output of the O2 sensor is determined to have reversed at step 107, the learning value KAV of KO2 is calculated in accordance with Equation (2) stated above as well as setting the KAV flag (110). If the output of the O2 sensor does not reverse at step 107, the process proceeds to step 111. At step 111, whether the KAV calculation period set at step 136 has elapsed is determined. This period is set to two seconds for example, and consequently the process from step 113 onward is carried out according to the KAV averaged and updated for two seconds. If the set period has not elapsed, the operation exits this process.

If the KAV calculation period has elapsed, whether the PGOK flag is set to 1 is determined (113). As this flag will be set to 1 at step 127 but is initially 0, the process proceeds to a malfunction determination parameter KO2AVE calculation routine 115. The routine 115 calculates the malfunction determination parameter KO2AVE in accordance with above-stated Equations (3) and (4). Then, whether the purge cut request flag PGREQ explained with reference to FIG. 5(f) is set to 1 is determined (116). If it is not set, the current value of KO2AVE is held in the memory as an initial value of the estimated value of the malfunction determination parameter KO2AVES (117), and the process proceeds to step 118. If the purge cut request flag PGREQ is set to 1, the process directly proceeds to step 118.

At step 118, whether the malfunction determination parameter KO2AVE exceeds the upper limit, e.g. 1.190, is determined. Exceeding the upper limit means that the fuel feed system is malfunctioning. Therefore, the purge cut request flag PGREQ is set to 0, a forced purge cut flag FMPG is set to 0 (119), a flag indicating the fuel system is malfunctioning is set to 1 (120), an FSDD flag is set to 1 (121), the KAV calculation timer is set (136), and the operation ends this process. In continuous monitoring of the fuel system and misfiring, the FSDD flag is intended to prevent normal failure monitoring from being resumed in the operation cycle in which malfunctioning fuel feed system has been detected, even if the fuel feed system is detected normal afterwards.

If KO2AVE is the upper limit or less at step 118, the process proceeds to step 123 to determine whether the forced purge cut flag FMPG is set to 1. FMPG is set to 1 (229) when the purge request flag PGREQ is set to 1 in the flow of FIG. 7 to be explained below (227).

Since no forced purge cutting is carried out at first, the process proceeds to step 128 and whether the malfunction determination parameter KO2AVE is smaller than the first decision value (see FIG. 5) is determined (128). If smaller, this means that the fuel feed system may be malfunctioning, and whether the aforementioned FSDD flag is set to 1 is determined (129). If this flag is set to 1, this means that malfunction of a fuel system has already been detected, the operation exits this process after going through step 119 thereafter. If the FSDD flag is not set to 1, the purge cut request flag PGREQ is set to 1 (130), the KAV calculation timer is set (136) and the operation exits this process.

If KO2AVE is the first decision value or more at step 128, the fuel feed system is determined to be normal. A fuel system normal flag is set (131), the KAV calculation timer is set (136) and the operation exits this process.

If forced purge cutting is in the execution at step 123, the process will proceeds to steps 124 and 125 to wait for the lapse of a predetermined period of around 30 seconds. A counter is incremented at step 124 and whether the count has reached a value corresponding to 30 seconds for example is determined at step 125. If reached, the KAV calculation timer is set to end the process and the process reaches step 124 again in the next processing cycle. When a preset period has elapsed in cycles, whether the malfunction determination parameter KO2AVE has reached or exceeded the second decision value (see FIG. 5) is determined at step 126. If KO2AVE has reached or exceeded the second decision value, the decrease of KO2AVE below the first decision value is determined to be caused by purging and not by any failure in the fuel feed system, as stated with reference to FIG. 5.

Therefore, the process proceeds to step 127, where the PGOK flag indicating the above-mentioned determination is set to 1, the counter used at steps 124 and 125 is reset, and the purge cut request flag PGREQ is set to 0. Then, the process proceeds to step 131, where the fuel system normal flag indicating the normal fuel feed system is set, and the KAV calculation timer is set (136) and the operation exits this process.

Reaching step 113 in the next processing cycle, as the PGOK flag is set to 1 this time, the process enters into the routine to calculate the estimated value of malfunction determination parameter KO2AVES (114). In this routine, the estimated value KO2AVES is calculated with the malfunction determination parameter KO2AVE as the initial value in accordance with Equations (3) and (4) stated above. The parameter KO2AVE is already held in the memory at step 117 in the immediately preceding processing cycle in which the purge cut request flag PGREQ was set to 1.

Figure 7:
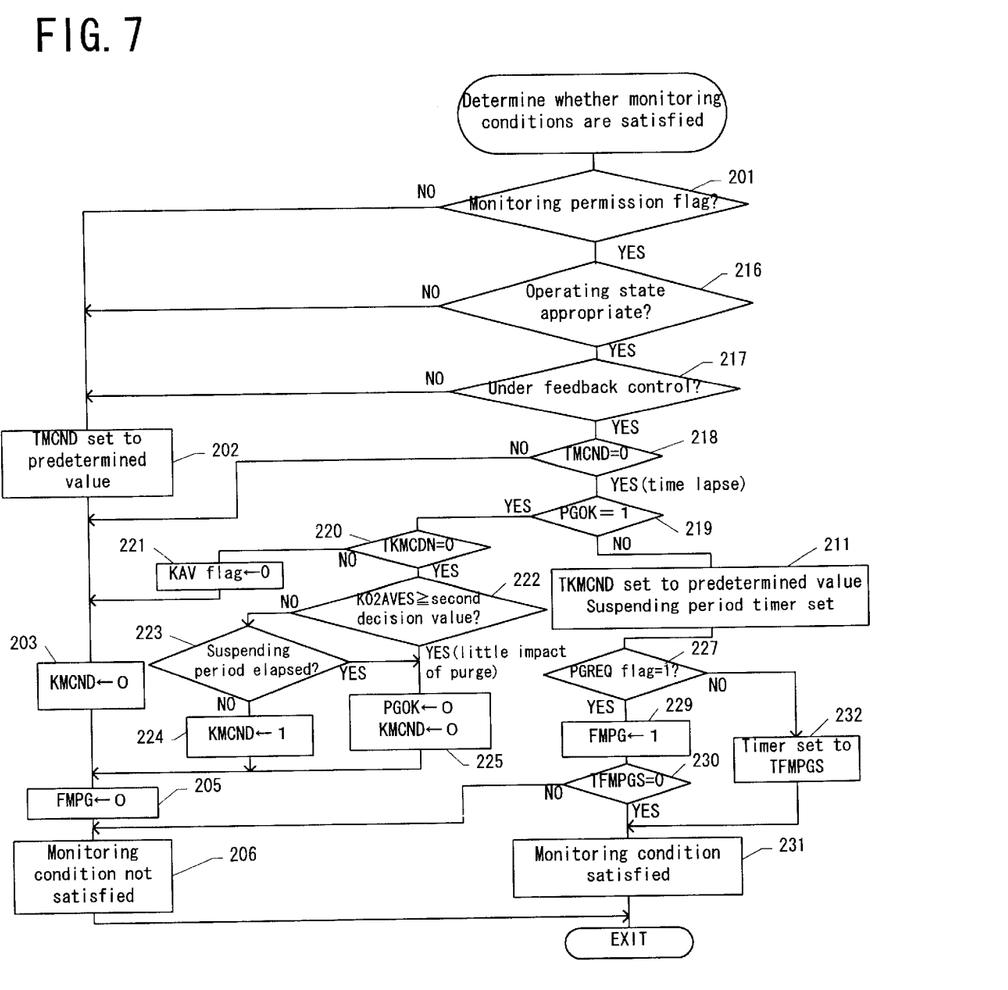
FIG. 7 is a flow chart illustrating the process of judging whether the conditions for the implementation of the monitoring are satisfied in the preferred embodiment of the invention.

FIG. 7 illustrates a flow to determine whether the implementing conditions for the monitoring are satisfied. While the processing shown in FIG. 6 is carried out every 10 milliseconds, the processing shown in FIG. 7 is carried out, for example, every 200 milliseconds.

In the flow of FIG. 7, the monitoring permission flag at step 201 is a flag to be set when a central management unit of the ECU 5 permits the monitoring on the fuel feed system through managing various processes. When the monitoring is permitted, whether each of the engine revolution NE, air intake pipe pressure PB, engine water temperature TW and air intake temperature TA or the like is within each appropriate range is determined (216). If each parameter is determined to be within each preset appropriate range, whether the engine is operated in the A/F ratio feedback control mode is determined according to an A/F ratio feedback control mode flag (217).

If determined "NO" at steps 201, 216 and 217, a predetermined period, e.g. two seconds, is set on a TMCND timer (202). If operated in the feedback control at step 217, the process proceeds to step 218, where whether the period set at step 202 has elapsed is determined. This period is the waiting time for the stabilization of the operating mode.

If the predetermined period has elapsed at step 218, whether the PGOK flag is set to 1 is determined (219). The PGOK flag is a flag set to 1at step 127 in FIG. 6, and its timing is shown in FIG. 5(e). As stated above, this flag indicates that the purging causes the decrease of the malfunction determination parameter KO2AVE below the first decision value and the fuel feed system itself is normal. Therefore, when this flag is set, the process enters into a determining process whether the estimated value of the malfunction determination parameter KO2AVES becomes greater than the second decision value.

If the PGOK flag is set to 0 at step 219, the process proceeds to step 211. At step 211, the predetermined value mentioned above is set in the TKMCND timer to be referenced at step 220, and the aforementioned period, e.g. five minutes, is set in the suspending period timer to be referenced at step 223. These settings intend to provide for entering into the flow of step 220 from step 219 when the PGOK flag is set in the next and subsequent processing cycles.

Then whether the purge cut request flag PGREQ is set to 1 is determined (227). If it is not set to 1, a post-purge cut stabilization timer TFMPGS is set (232), a failure monitoring condition satisfied flag is set (231) and the operation exits this process. If the purge cut request flag PGREQ is set to 1, the process proceeds to step 229, and the forced purge cut flag is set to 1 (229) to suspend purging. Then whether a post-purge cut stabilization period TFMPGS, e.g. six seconds, has elapsed is determined at step 230. The monitoring condition is kept unsatisfied until the post-purge cut stabilization period TFMPGS elapses. Therefore, the A/F ratio correction coefficient KO2 can rise by the shifting of the A/F ratio to the lean side because of the purge cutting. Furthermore, misdiagnosis can be avoided by suspending various calculations until this rise in KO2 ends and is stabilized. If the post-purge cut stabilization period TFMPGS has elapsed, the monitoring condition is set satisfied (231). If it has not, the monitoring condition is not satisfied (206).

If the PGOK flag is set to 1at step 219, the process proceeds to step 220, and whether a stabilization period, e.g. five seconds, has elapsed is determined (220). The stabilizing period is an estimated period for the decrease of KO2 due to the resumption of purging to stop. As seen in FIG. 5, simultaneously with the setting of the PGOK flag to 1, the purge cut request flag PGREQ is set to 0 to resume the purging, and then KO2 decreases by the resumed purging. Consequently, KAV calculation is suspended until the decrease stops and misdiagnosis can be avoided. If the determination at step 220 is "YES", whether KO2AVES becomes the second decision value (see FIG. 5) or more is determined (222). If the determination is "YES", the PGOK flag (FIG. 5(e)) is set to 0, and the aforementioned KMCND flag is set to 0 (225).

The forced purge cut flag FMPG is set to 0 (205). Setting the PGOK flag to 0 (225) causes the next processing cycle to enter into the flow of step 211 from step 219, and the monitoring condition is satisfied at step 231.

If the predetermined period has not elapsed at step 220, the KAV flag is set to 0 (221), and the aforementioned KMCND flag is set to 0 (203). When the determination at step 222 is "NO", whether a period set as the maximum permissible duration, e.g. five minutes, for suspending the fuel feed system monitoring has elapsed is determined (223). If elapsed, the process proceeds to step 225 and the monitoring condition is satisfied (231) to resume the failure monitoring on the fuel feed system. If the period for suspending has not elapsed at step 223, the KMCND flag indicating the estimation of KO2AVES is set to 1 (224). The process proceeds to step 205 to set an FMPG flag to 0, the monitoring condition is determined unsatisfied (206) and the operation exits from this process.

Although the preferred embodiments of the present invention have been described in the foregoing, the invention is not confined to such embodiments.

According to one aspect of the invention, a state allowing a resumption of a failure monitoring on a fuel system can be quickly determined. Further, according to another aspect of the invention, a more stable system operation can be achieved because the resumption of the failure monitoring is decided based on malfunction determination parameter, which is a more stable factor than an A/F ratio coefficient and its learning value.

What is claimed is:

1. A monitoring apparatus for monitoring a fuel feed system of an internal combustion engine, comprising:
   an air fuel ratio detector provided in an exhaust system of the engine;
   an A/F ratio controller for performing feedback control of the A/F ratio based on an output of said detector;
   means for calculating an A/F ratio feedback coefficient based on the output of said detector;
   means for calculating a malfunction determination parameter based on the A/F ratio feedback coefficient;
   a purge cut controller for suspending purging when the parameter reaches a first decision value;
   a monitor controller for suspending the monitoring when the parameter reaches a second decision value in a purge cutting state; and
   means, responsive to the malfunction determination parameter reaching the second decision value, for estimating a value of the malfunction determination parameter it would take if purge cut was not carried out, an initial value of the estimation being the value when the parameter reached the first decision value.

2. The monitoring apparatus of claim 1, wherein said monitor controller resumes monitoring when an estimated value of the malfunction determination parameter reaches the second decision value.

3. The monitoring apparatus of claim 2 further comprising means for determining that the fuel feed system is malfunctioning if the malfunction determination parameter fails to reach the second decision value after purge cutting, wherein the parameter is determined according to an learning value of the A/F ratio feedback coefficient.

4. A monitoring apparatus for monitoring a fuel feed system of an internal combustion engine, comprising an electronic control unit and an air fuel ratio detector provided in an exhaust system of the engine, said electronic control unit being programmed to:
- perform feedback control of the A/F ratio based on an output of the detector;
- calculate an A/F ratio feedback coefficient according to the output of the detector;
- calculate a malfunction determination parameter based on the A/F ratio feedback coefficient;
- suspend purging when the parameter reaches a first decision value;
- suspend monitoring when the parameter reaches a second decision value in a purge cut state; and to
- estimate, responsive to the malfunction determination parameter reaching the second decision value, a value of the malfunction determination parameter it would take if purge cut was not carried out, an initial value of the estimation being the value when the parameter reached the first decision value.

5. The monitoring apparatus of claim 4 wherein said electronic control unit comprises a microprocessor.

6. The monitoring apparatus of claim 5 wherein the microprocessor is further programmed to resume the monitoring when an estimated value of the malfunction determination parameter reaches the second decision value.

7. The monitoring apparatus of claim 6 wherein the microprocessor is further programmed to determine that the fuel feed system is malfunctioning if the malfunction determination parameter fails to reach the second decision value after purge cutting, wherein the parameter is determined according to a learning value of the A/F ratio feedback coefficient.

8. A Method for monitoring a fuel feed system of an internal combustion engine having an electronic control unit and an air fuel ratio detector provided in an exhaust system of the engine comprising:
- performing feedback control of the A/F ratio based on an output of the detector;
- calculating an A/F ratio feedback coefficient according to the output of the detector;
- calculating a malfunctioning determination parameter based on the A/F ratio feedback coefficient;
- suspending purging when the parameter reaches a first decision value;
- suspending monitoring when the parameter reaches a second decision value in a purge cut state; and
- estimating, responsive to the malfunction determination parameter reaching the second decision value, a value of the malfunction determination parameter it would take if the purge cut was not carried out, an initial value of the estimation being the value when the parameter reached the first decision value.

9. The method of claim 8 further comprising resuming monitoring when an estimated value of the malfunction determination parameter reaches the second decision value.

10. The method of claim 9 further comprising determining that the fuel feed system is malfunctioning if the malfunction determination parameter fails to reach the second decision value after purge cutting, wherein the parameter is determined according to a learning value of the A/F ratio feedback coefficient.

* * * * *